(12) United States Patent  
Suchak

(10) Patent No.: US 8,865,098 B2  
(45) Date of Patent: Oct. 21, 2014

(54) METHOD FOR REMOVING CONTAMINANTS FROM EXHAUST GASES

(71) Applicant: Naresh J. Suchak, Glen Rock, NJ (US)

(72) Inventor: Naresh J. Suchak, Glen Rock, NJ (US)

(73) Assignee: Cannon Technology, Inc., Natrona Heights, PA (US)

( * ) Notice: Subject to any disclaimer, the term of this patent is extended or adjusted under 35 U.S.C. 154(b) by 0 days.

(21) Appl. No.: 13/998,248

(22) Filed: Oct. 15, 2013

(65) Prior Publication Data

US 2014/0127107 A1 May 8, 2014

Related U.S. Application Data

(60) Provisional application No. 61/713,780, filed on Oct. 15, 2012.

(51) Int. Cl.
*B01D 53/56* (2006.01)
*B01D 53/74* (2006.01)
*B01D 53/78* (2006.01)
*B01D 53/60* (2006.01)
*F01N 3/18* (2006.01)
*B01D 53/64* (2006.01)
*B01D 53/76* (2006.01)
*B01D 53/73* (2006.01)
*B01D 53/75* (2006.01)

(52) U.S. Cl.
CPC .............. *F01N 3/18* (2013.01); *B01D 2259/10* (2013.01); *B01D 53/78* (2013.01); *B01D 53/60* (2013.01); *B01D 2259/122* (2013.01); *B01D 53/64* (2013.01); *B01D 2257/40* (2013.01); *B01D 2257/404* (2013.01); *B01D 53/76* (2013.01); *B01D 53/56* (2013.01); *B01D 53/73* (2013.01); *B01D 2251/104* (2013.01); *B01D 2258/0283* (2013.01); *B01D 53/75* (2013.01)
USPC ............................ 423/210; 423/235; 422/170

(58) Field of Classification Search
USPC .................................. 423/210, 235; 422/170
See application file for complete search history.

(56) References Cited

U.S. PATENT DOCUMENTS 6,197,268 B1 * 3/2001 Hwang et al. ................. 423/235
6,958,133 B2 * 10/2005 Hammer et al. .............. 422/171
8,444,942 B2 * 5/2013 Suchak ......................... 423/210

* cited by examiner

*Primary Examiner* — Timothy Vanoy
(74) *Attorney, Agent, or Firm* — Price & Adams, P.C.

(57) ABSTRACT

In a method for removing a portion of contaminants, such as nitrogen oxides, from an exhaust gas stream of a combustion process, the exhaust gas stream is separated into two or more gas streams. At least one of the two or more gas streams is treated first by mixing with ozone. The treated gas stream is then fed to a scrubber where it is recombined with the untreated gas stream. Excess ozone present in the treated gas stream is consumed by oxidation of contaminants in the untreated gas stream before the combined gas stream is released to the atmosphere. The portion of the gas stream separated for mixing with ozone directly correlates to the amount of nitrogen oxides that are desired to be removed from the stream.

21 Claims, 7 Drawing Sheets

METHOD FOR REMOVING CONTAMINANTS FROM EXHAUST GASES

CROSS REFERENCE TO RELATED APPLICATION

The present application claims priority from U.S. Provisional Application No. 61/713,780 filed Oct. 15, 2012.

BACKGROUND OF THE INVENTION

1. Field of the Invention

The present invention relates to method and apparatus for removing contaminants, such as nitrogen oxides, sulfur oxides, particulates, heavy metals and other acid gases, from gas streams arising from chemical, metallurgical, partial and full combustion processes, as for example, exhaust streams generated exhausts from engines or boilers on mobile sources such as sea going, naval or other vessels.

2. Description of the Prior Art

The use of ozone for oxidizing nitrogen oxides is described in U.S. Pat. Nos. 5,206,002; 6,162,409; 6,649,132; and 7,303,735. These chemistries and techniques are directed towards high levels of nitrogen oxides removal (around 90%) and require 1.5 moles of ozone per mole of nitrogen oxide present in the gas stream. Configuring these processes to operate at lower levels of nitrogen oxides removal causes both economic and process challenges.

Combustion and chemical processes generally result in gas streams containing contaminants that need cleanup before being exhausted to the atmosphere. Many industrial processes, power generating utilities, combustion sources, stationary and mobile sources such as engines, boilers, kilns and the like use solid fuels or low cost hydrocarbon fuels that contain sulfur, chlorine, nitrogen and metal compounds in hydrocarbons which result in exhaust gases that contain contaminants such as acid gases, particulate matter and heavy metals. To comply with stricter environmental rules mandated by legislation and a greater concern for the environment, combinations of scrubbing (wet or dry) and particulate capture devices such as electrostatic precipitators (ESP), wet ESP and bag house are increasingly preferred for emissions control of acid gas and particulate matters.

Nitrogen oxides found in most combustion exhaust streams are in the form of nitric oxide (NO), which is mostly insoluble in water and not very reactive. Nitric oxide is not removed by most wet or dry scrubber capture devices. Therefore, to control nitrogen oxides emissions, the two major options are to lower nitrogen oxides formation at the source by modifying combustion or secondly treating nitrogen oxides in the exhaust gas stream using post combustion techniques.

Primary techniques used for reducing nitrogen oxides formation by modifying combustion are low nitrogen oxides burner (LNB), flue gas recirculation (FGR), staged combustion and over fire air (OFA). In most applications these technologies are not adequate for removing nitrogen oxides from combustion gas streams and post combustion techniques, such as selective catalytic reduction (SCR) and selective non-catalytic reduction (SNCR), become necessary to achieve the desired nitrogen oxides reduction.

Both SCR and SNCR processes realize good results but also have limitations. Ozone based oxidation technologies have recently gained success as an alternative post combustion technique, especially when an application is not suitable for SCR. Ozone based processes as described in U.S. Pat. Nos. 6,162,409, 5,206,002 and 7,303,735 provide multi-pollutant removal approaches and they have been implemented on flue gases that arise from gas and coal fire boilers removing multiple pollutants including nitrogen oxide, sulfur oxides, particulates, etc. Ozone based processes are also industrially practiced in lowering emissions in other applications such as metal pickling processes, fluidized catalytic cracker (FCC) regenerators, metal recovery furnaces and sulfuric acid manufacture.

Coal fired boilers with low nitrogen oxides burners and staged combustion often attain nitrogen oxides in 0.25 to 0.4 lb/MMBTU cost effectively whereas regulations require nitrogen oxides emissions in a range of 0.1 to 0.15 lb/MMGBTU i.e., post combustion technology that can cost effectively offer 40 to 70% reduction.

The methods disclosed in U.S. Pat. Nos. 6,162,409, 5,206,002, 6,649,132 and 7,303,735 use chemistry of nitrogen oxides reaction with ozone by forming higher oxides of nitrogen, especially the pentavalent form or higher which are quite water soluble and readily removed by wet scrubbing. The stoichiometric amount of ozone required to convert one mole of $NO_X$, in the form of NO, to the pentavalent form is about 1.5 moles of ozone and 0.5 moles if $NO_X$ is in the form of $NO_2$.

Although these ozone based methods for removing nitrogen oxides from combustion streams are effective at achieving ultra low levels of nitrogen oxides emissions in the treated gas stream, there is need for an improved process for partial removal of nitrogen oxides that addresses the economic, regulatory and process challenges presented by emission controls.

SUMMARY OF THE INVENTION

In accordance with the present invention there is provided a method for the partial removal of contaminants from a process gas stream that includes the step of separating a process gas stream into at least two process gas streams. Ozone is fed into contact with at least one of the separated process gas streams to oxidize the contaminants in the gas stream. At least one of the process gas streams contacted by ozone is fed to a scrubber for removal of the oxidized contaminants from the gas stream.

Further in accordance with the present invention there is provided a method for the partial removal of contaminants from a process gas stream that includes the step of conditioning the process gas stream emitted from a combustion process. The process gas stream containing contaminants is separated into at least two process gas streams. Ozone is injected into at least one of the separated process gas streams to provide mixing of the ozone with the contaminants including nitrogen oxides in the separated process gas stream. The nitrogen oxides in the separated process gas stream are oxidized by mixing with ozone. The oxidized nitrogen oxides are captured in a capture device to remove the nitrogen oxides from the separated process gas stream. The separated process gas stream substantially free of nitrogen oxides is recombined with the remainder of the process gas stream containing contaminants.

Further in accordance with the present invention there is provided a method for the partial removal of contaminants from a process gas stream that includes the step of conditioning the process gas stream emitted from a combustion process. The process gas stream containing contaminants is divided into at least two process gas streams. Ozone is injected into a selected one of the process gas stream for mixing of the ozone with the contaminants including nitrogen oxides. The nitrogen oxides in the selected process gas stream are oxidized by ozone. The oxidized nitrogen oxides are removed by a capture device from the selected process gas stream. Then the selected process gas stream substantially free of nitrogen oxides is recombined with the remaining process gas stream containing contaminants.

Further the present invention is directed to apparatus for the partial removal of contaminants from a process gas stream that includes a duct for conveying the process gas stream containing nitrogen oxides from the exhaust of a combustion process. The duct is partitioned into at least two zones for receiving the process gas stream containing contaminants to divide the process gas stream into at least two streams. A source of ozone is injected into a selected one of the two zones for mixing with the process gas stream. The ozone mixed with the process gas stream oxidizes the nitrogen oxides in the process gas stream in the selected zone.

Further the present invention is directed to apparatus for the partial removal of contaminants from a process gas stream that includes a duct and a scrubber or any process equipment conveying the process gas stream containing nitrogen oxides from the exhaust of a combustion or chemical process. The ozone is introduced in the process gas stream to selectively mix with a portion of the gas stream with or without physical partitioning to result into at least two process gas zones. One zone is significantly mixed with ozone and the other is not mixed with ozone. The ozone in a portion of the process gas stream oxidizes the nitrogen oxides in the process gas stream.

The contaminants contained in the process gas stream for treatment are selected from the group consisting of nitrogen oxides, sulfur oxides, acid gases, particulate matters and mercury. The nitrogen oxides treated are selected from the group consisting of nitric oxide and nitrogen dioxide. The process gas stream is an exhaust gas stream from an industrial process, typically from a source selected from the group consisting of fixed sources and mobile sources. The industrial process is selected from the group consisting of industrial boilers, power generation systems, chemical processing, kilns, furnaces and combustion processes.

The amount of contaminants removed is about the amount of ozone added to the at least one of the two or more process gas streams.

The scrubber is typically selected from the group consisting of dry, semi-dry and wet scrubbing equipment. The amount of ozone that is added to the at least one of the two or more separated gas stream in an amount of greater stoichiometry than the amount of nitrogen oxides present therein.

DETAILED DESCRIPTION OF THE INVENTION

Figure 1:
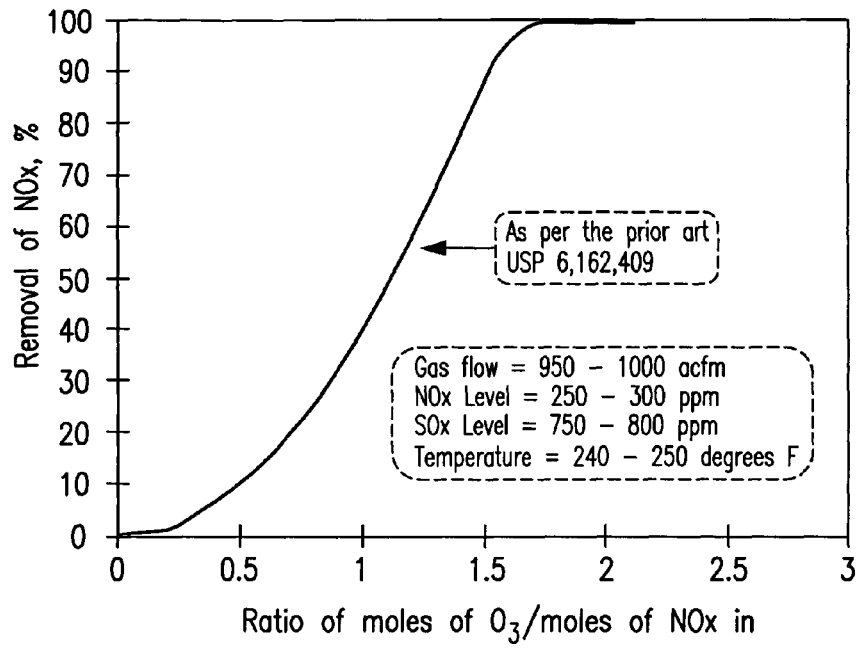
FIG. 1 is a graph, illustrating nitrogen oxides removal versus molar ratio of ozone to nitrogen oxides.

The present invention provides for the oxidation of nitrogen oxides and other contaminants by the addition of ozone to a separated portion of the process gas stream. The total process gas or flue gas stream is divided into at least two or more streams. The portion of the total process gas stream that is to be treated with ozone is determined based on the extent of nitrogen oxides removal desired. For purposes of illustration, to remove 60% of the nitrogen oxides from the process gas stream, approximately 60% of the gas stream may be mixed with ozone and treated by the methods of the invention.

Nitrogen oxides generated in combustion processes are mostly in the form of NO which has negligible solubility in water. By adding ozone to the exhaust gas stream, nitrogen oxides can be oxidized to higher forms. Solubility of nitrogen oxides increases with the degree of oxidation. Higher oxides such as $N_2O_5$ and oxyacids are not only very soluble but also highly reactive and they can be removed in dry, semi-dry and wet scrubbing equipment along with other contaminants present in the exhaust gas stream so treated.

Although various methods as disclosed by the prior art are effective in achieving ultra low levels of nitrogen oxides emissions, when applied to removing only a portion of the nitrogen oxides present in the exhaust gas stream, they will generate appreciable amounts of $NO_2$ which is not quantitatively removed in the capture device employed. It is well understood that only when nitrogen oxides are oxidized beyond $NO_2$ to higher oxides such as $N_2O_5$, quantitative removal occurs in industrially used capture devices.

Nitrogen oxides oxidation to $N_2O_5$ involves many reactions but for the sake of brevity, it can be simplified as follows:

$$NO + O_3 \rightarrow NO_2 + O_2 \text{(very fast)} \tag{1}$$

$$NO_2 + O_3 \rightarrow NO_3 + O_2 \text{(slow)} \tag{2}$$

$$NO_2 + NO_3 \leftarrow \rightarrow N_2O_5 \tag{3}$$

The reaction (1) is an order of magnitude faster when compared to reaction (2). By the time reaction (2) starts to occur, most of the NO is oxidized to form $NO_2$. Therefore, reactions (1) and (2) are somewhat consecutive reactions.

Nitrogen dioxide ($NO_2$) has relatively low solubility in water, so unless the reaction is brought forward to the formation of oxides higher than $NO_2$, removal of nitrogen oxides in a wet scrubber remains very limited. On the other hand, $N_2O_5$ is extremely soluble and with moisture present in the gas stream. As a result, $N_2O_5$ forms $HNO_3$ which is soluble with water in all proportions. Therefore, any capture device, wet scrubber, wet ESP or any device with wet surfaces such as a condenser or coalescing device such as a mist eliminator will remove $HNO_3$ and $N_2O_5$ quantitatively with or without any reagent present in the aqueous phase.

The highly oxidized forms $HNO_3$ and $N_2O_5$ are also very reactive and are removed using most common reagents and adsorbents industrially used in dry and semi-dry scrubbing. $N_2O_5$ and $HNO_3$ are also removed in fabric filter by adsorption on particulate matters in a capture device such as bag house.

The stoichiometric amount of ozone required to convert one mole of NO and $NO_2$ to pentavalent form namely $N_2O_5$ and/or $HNO_3$ is about 1.5 and 0.5 moles respectively. In the majority of combustion processes, nitrogen oxides are predominantly in the form of NO. In fact by and large, most nitrogen oxides emitted from various types of sources is in the form NO.

FIG. 1 depicts the removal of nitrogen oxides versus the ratio of moles of ozone to moles of nitrogen oxides in the exhaust gas from a coal fired boiler. This figure, which appears in U.S. Pat. No. 6,162,409, shows the overall stoichiometric ratio of 1.5 moles of ozone required per mole of nitrogen oxides for greater than 90% nitrogen oxides removal. This ozone requirement is per mole of nitrogen oxides present in the gas stream and not per mole of nitrogen oxides removed.

When only a partial amount of nitrogen oxides reduction is required, ozone required per mole of nitrogen oxides removed far exceeds 1.5. To remove 50% of nitrogen oxides (mostly as NO) a series of reactions must occur. When the ozone is added and thoroughly mixed in the gas stream, ozone first reacts with NO present in the nitrogen oxides to convert to $NO_2$. Only after almost all of the NO is oxidized does $NO_2$ oxidation to $N_2O_5$ begin.

To achieve 50% removal with two moles of nitrogen oxides present in the gas stream, one mole of nitrogen oxides need to be removed. For this 50% removal example, with two moles of nitrogen oxides in the form of NO, two moles of ozone are required to convert to two moles of $NO_2$ as per reaction (1) above. Since $NO_2$ is only partially soluble, in order to achieve 50% removal, one mole out of two moles of $NO_2$ must be converted to a pentavalent form. Therefore an additional 0.5 moles of ozone is required to convert one mole of $NO_2$ to a pentavalent form $N_2O_5$. Thus the total ozone requirement is 2.5 moles per mole of nitrogen oxides removed when the nitrogen oxides targeted removal is only 50%.

As disclosed in U.S. Pat. No. 6,162,409, the data used in FIG. 1 is plotted in FIG. 2 as nitrogen oxides removal versus ratio of mole of ozone consumed to moles of nitrogen oxides removed in the exhaust gas from a coal fired boiler. It is well illustrated that the moles of ozone required per mole of nitrogen oxides removed increases with the decrease in nitrogen oxides removal. For 50% nitrogen oxides removal, the molar ratio of ozone consumed to nitrogen oxides removed is closer to 2.5. In essence, the nitrogen oxides reaction with ozone and removal by a capture device was oversimplified in this example but detailed enough to show the limitation of the prior art process. The partial removal of nitrogen oxides with these earlier processes has limitations which the present invention overcomes.

The merits of a nitrogen oxides removal process are evaluated with respect to many attributes of which there are four fundamental ones. First, what level of nitrogen oxides removal can the process achieve? Second, how affordable are the ownership costs in both capital and operating terms per ton of nitrogen oxides removed (cost effectiveness)? Third, are secondary emissions within acceptable limits? Fourth, how compatible is nitrogen oxides removal process with removal of other contaminants?

Figure 2:
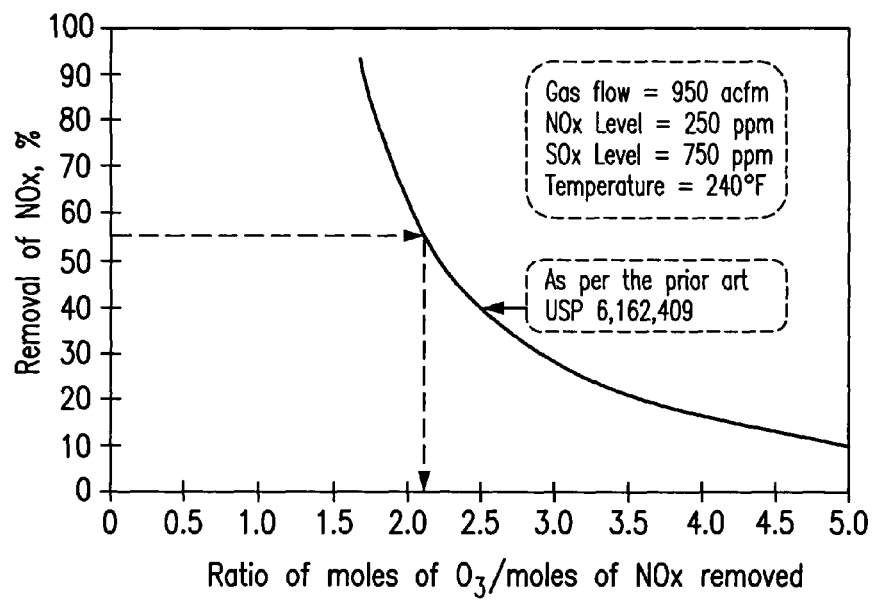
FIG. 2 is a graph, illustrating nitrogen oxides removal versus molar ratio of ozone to nitrogen oxides removed.

The limitations that the prior art processes fall short in measuring up to the second and third attributes. Ozone is a costly commodity. The amount of ozone required per unit of nitrogen oxides removal increases rapidly with reduction in nitrogen oxides removal requirement. Half a century ago, most countries in the world did not have mandatory requirement of reducing nitrogen oxides emissions. As air quality worsened due to increasing air emissions, governmental bodies put in place environmental regulations that mandated the gradual lowering of nitrogen oxides emissions. In the initial phase of implementation of these regulations, the nitrogen oxides reduction from fixed sources such as industrial boilers, power generation systems, combustion processes as well as mobile sources such as ships, barges, etc. are modest. The prior art processes use significantly greater amounts of ozone per unit of nitrogen oxides removed at low or modest nitrogen oxides reduction requirements, as it is depicted in FIG. 2, and offer poor cost effectiveness thereby falling short with respect to the second attribute. The prior art processes are directed toward very high nitrogen oxides reduction requirements.

At low or modest nitrogen oxides reduction requirements, using methods disclosed in the prior art, the ozone treated gas stream also has significantly higher $NO_2$ content. Nitrogen dioxide is brown in color and increases the opacity of the exhaust. The large stationary sources, such as fossil fuel or biomass fired boilers or combustion sources, have huge exhaust streams and are vulnerable to default on opacity specifications by not satisfying the third attribute above.

The rate at which nitrogen oxides and ozone react is dependent on the kinetic rate constant, as well as the concentration of nitrogen oxides and ozone. With a decrease in concentration, the rate of reaction also decreases. As described earlier in the 50% nitrogen oxides removal case, 2.5 moles of ozone is required per mole of nitrogen oxides removed. The reaction (1) above is very fast and consumes two moles of ozone leaving only 0.5 moles of ozone for the slower reaction (2). In order to achieve the required oxidation, either the exhaust gas stream processing vessel must be large enough to provide the necessary residence time between $NO_2$ and ozone or excess ozone must be added, which may result in some residual ozone in the treated flue gas that is not consumed in the scrubbing process.

Partial nitrogen oxides removal, per the prior art processes, is achieved at sub-stoichiometric ratios of ozone and oxidized stream having a mixture of $N_2O_5$ and $NO_2$. Scrubbing removes all $N_2O_5$ and some $NO_2$. On scrubbing $N_2O_5$ only nitrate is formed; whereas, scrubbing $NO_2$ forms a mixture of nitrite and nitrate of alkali or alkaline earth metals. The presence of nitrite in the scrubber purge is undesired and poses challenges in handling and treating liquid streams in the effluent treatment plant.

When the flue gas also has sulfur oxides present in it, $SO_2$ absorption produces sulphite in the scrubbing medium. Sulphite is an ozone scavenger and helps to eliminate excess ozone in wet scrubbing devices. $NO_2$ also reacts with sulphite when it is present in large concentrations and depletes sulphite potentially creating conditions for ozone slip. In lime and limestone based reagents, large concentrations of $NO_2$ also affect sulfur oxides removal adversely thus not satisfying the fourth attribute.

In accordance with present invention, the amount of the process gas stream to be treated for nitrogen oxides removal is about the same percentage as the amount of nitrogen oxides removal. For example, if the operator wishes to remove 60% of the nitrogen oxides in a flue gas stream, then the operator will treat 60% of the total flue gas stream with ozone. The operator thereby separates the primary flue gas stream into two or more gas streams where at least one stream totals 60% of the total process gas stream by volume. An operator can conceivably treat two streams that total 60% of the total (30% and 30%) or three or more streams as long as the total percentage of treated streams is approximately equal to the percentage reduction in nitrogen oxides content for the entire process gas stream.

The portion of the gas stream that is oxidized with ozone proceeds along the reactions (1) to (3), as described above. The amount of ozone is based on the amount of nitrogen oxides in that portion of gas stream. A slight excess of stoichiometric requirement may be added to reduce the reaction time requirement. Nitrogen oxides in combustion flue gas streams are generally in the form of NO (divalent) and, therefore, stoichiometric requirement is 1.5 moles of ozone per mole of nitrogen oxides. However, when nitrogen oxides in the gas stream is from chemical or other sources and is a mixture of divalent (NO) and tetravalent ($NO_2$) forms, the stoichiometric requirement is then 1.5 moles of ozone per mole of divalent form and 0.5 moles of ozone per mole of tetravalent form.

Prior to mixing ozone, all or a portion of the gas stream to be mixed may be scrubbed, pre-scrubbed, selectively pre-scrubbed, quenched or conditioned as required. With respect to temperature, the optimum condition for oxidations is 40° F. to 225° F. in the gas stream. Preferably, the gas stream may be droplet free or free from excessive mist of the aqueous medium, if sulfur oxides are also present in the flue gas stream. Ozone is not added to the balance of the gas stream.

The oxidized contaminants in the ozone treated portion of the stream are removed by contacting with a scrubbing medium in a wet or semi-dry or dry scrubber. The oxidized contaminants, especially nitrogen oxides, are highly soluble in water and very reactive and, therefore, may also be removed in the aqueous medium on condensing or coalescing surfaces, such as heat exchangers or droplet separators. Alternatively, they may be captured in fabric filter (bag house), ESP (electrostatic precipitator), WESP (wet electrostatic precipitator), etc. Oxidized nitrogen oxides are converted to oxyacids, such as nitric acid and nitrous acid and salt.

The chemistry of this dissolution and stabilization of nitrogen oxides in the form of oxyacids and salts is described below.

$$N_2O_5 + H_2O \rightarrow 2\ HNO_3 \tag{4}$$

$$2HNO_3 + Ca(OH)_2 \rightarrow Ca(NO_3)_2 + H_2O \tag{5}$$

$$2\ H2O$$

$$HNO_3 + NaOH \rightarrow NaNO_3 + H_2O \tag{6}$$

For treating a portion of the process gas stream with ozone, the existing scrubber and APC (air pollution control) device may be modified simply by portioning the duct and/or scrubber while ensuring the oxidized portion of stream is contacted adequately with a scrubbing medium and contaminants are captured prior to unifying the portion of the stream with the balance of gas stream not treated with ozone.

When the ozone treated portion of the gas stream is reunited with the rest of the gas stream that is untreated, small amounts of excess ozone from the treated stream are instantaneously consumed in the recombined stream. An extremely fast oxidation reaction results, as stated in equation (1) above. Thus, the reunited stream ceases to have any residual ozone. Also, due to excess ozone present in the treated stream, almost all of the nitrogen oxides are oxidized to their pentavalent form and captured quantitatively in the capture device with insignificant amounts of leftover $NO_2$.

The present invention also provides the capability of an ozone free stack when high nitrogen oxides removal is desired. For example, for 90% nitrogen oxides removal, 10% of the untreated stream is mixed with 90% treated stream and residual ozone from the 90% treated stream is destroyed by the untreated nitrogen oxides present in the 10% gas stream.

The present invention provides a method and apparatus for the removal of contaminants such as nitrogen oxides in a relatively safe manner that does not cause secondary emissions and requires less ozone. Further, the present invention allows for the implementation of nitrogen oxides reduction in phases to match regulations that mandate a drop in nitrogen oxides emissions over time. Phase 1 might mandate a 30 to 35% nitrogen oxides reduction, while phase 2 mandates 60 to 65% reduction, and phase 3 requiring a 90 to 95% reduction. With the methods of the present invention, these mandated reductions are reached in a cost effective manner.

The processes of the present invention lower $NO_2$ emissions in the treated gas stream being exhausted to the atmosphere and the opacity of the plume irrespective of nitrogen oxides reduction required. In this manner residual ozone in the treated gas stream is eliminated and consequently ozone slip is inhibited. Ozone usage is optimized when partial nitrogen oxides reduction is performed. The present invention significantly lowers residence time requirement for effective nitrogen oxides oxidation without compromising efficiency and without causing ozone slip. Improved scrubber chemistry results, and consequently sulfur oxides removal efficiency is retained by inhibiting sulfite destruction in the scrubbing medium by $NO_2$. Thus, the methods of the present invention provide cost effective treatment when a gradual or stage wise implementation of nitrogen oxides abatement is performed.

Figure 3:
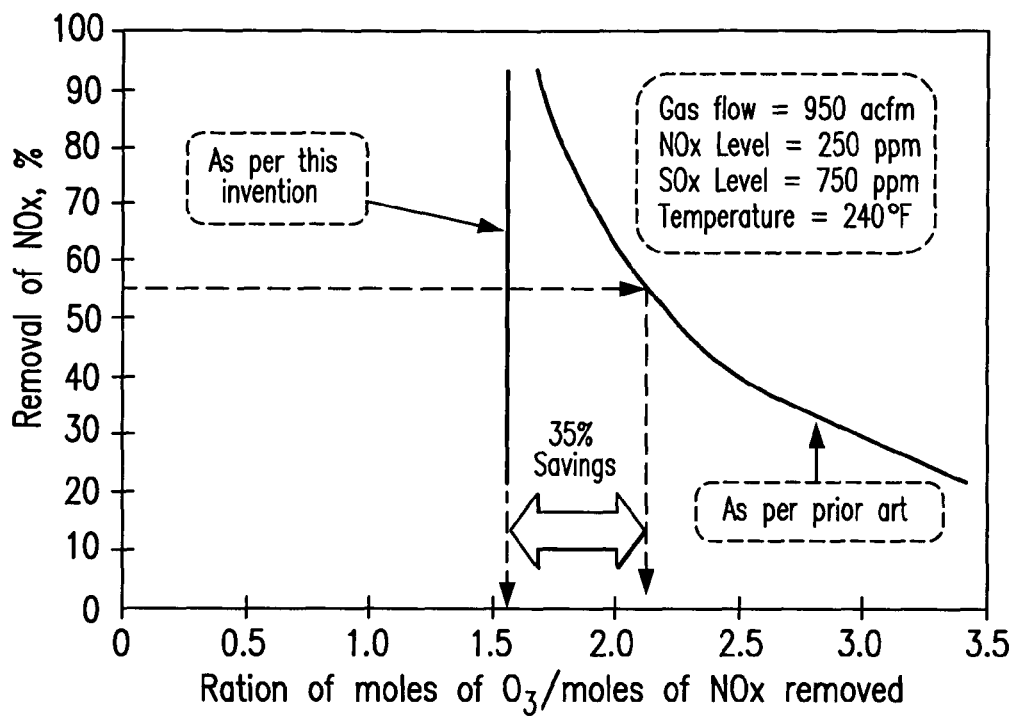
FIG. 3 is a graph, illustrating nitrogen oxides removal versus molar ratio of ozone to nitrogen oxides removed.

As illustrated in FIG. 3, unit ozone consumption per mole of nitrogen oxides removed remains almost identical. The consumption of ozone is 35% less in lowering 55% of the nitrogen oxides content compared with the prior art processes described above under identical conditions.

In addition to savings in the amount of ozone consumed, the present invention creates a dry exhaust stack, when a portion of the gas stream is not scrubbed and was thereby not saturated with water vapor. This eliminates any residual ozone and contains very low $NO_2$ content in the remaining nitrogen oxides. Since most of the nitrogen oxides absorbed is $N_2O_5$, only nitrate is formed in the scrubbing medium.

Figure 4:
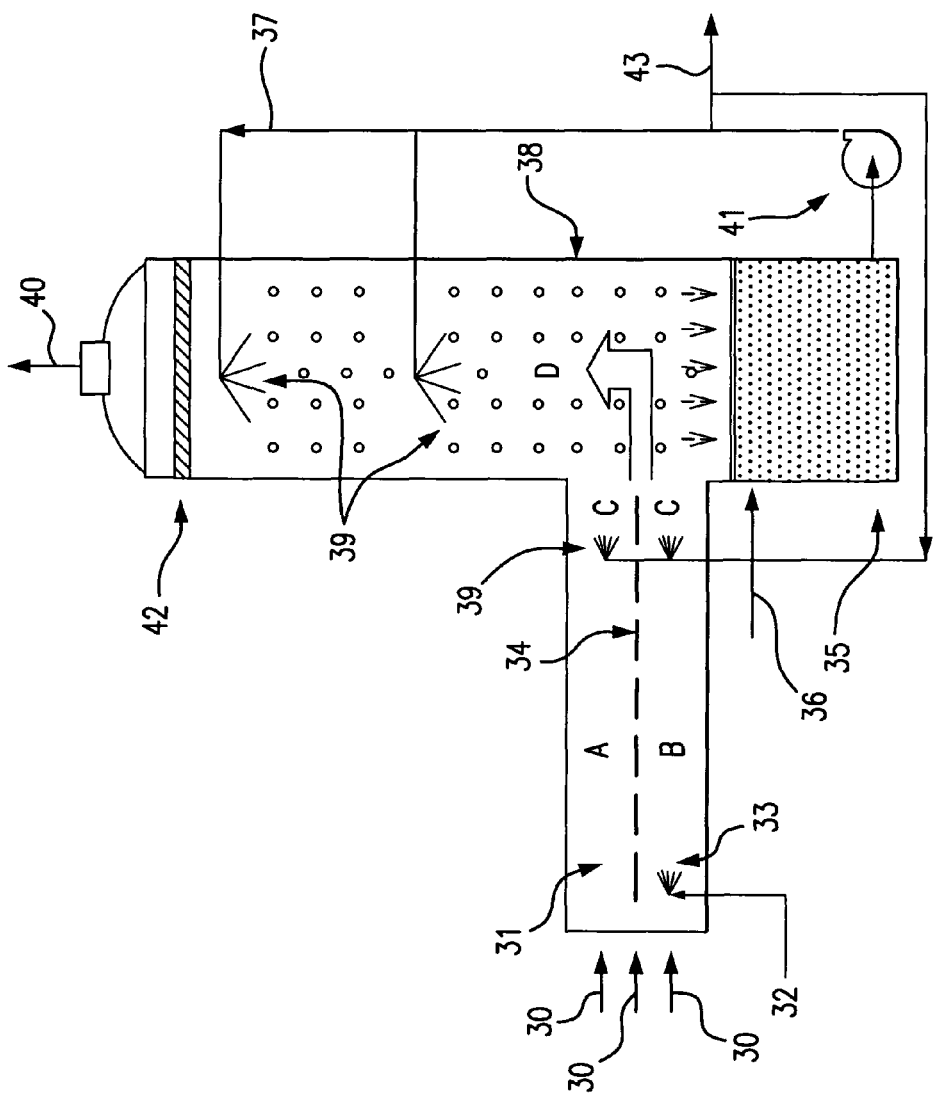
FIG. 4 is a system flow diagram of a process for the oxidation of nitrogen oxides in a partitioned duct.

Referring now to FIG. 4, there is schematically illustrated a vertical flue gas scrubber for the oxidation of nitrogen oxides in a partitioned duct. An untreated gas stream 30 is conveyed through duct 31 to a wet spray scrubber 38. In accordance with the present invention, the duct 31 is partitioned to treat a portion of the gas stream 30. Partition 34 divides duct 31 into two equal zones, A and B. Ozone from duct 32 is emitted from nozzle 33 for mixing with the gas stream in Zone B. Contaminants, including nitrogen oxides, are completely oxidized in the Zone B prior to contact with aqueous medium sprays from nozzles 39 connected to header spray assembly 37 in Zone C. Oxidized contaminants from Zone B, such as $N_2O_5$ and $HNO_3$, are readily captured in aqueous sprays in Zone C. The gas stream exiting from both Zones C is remixed in the bottom section of the scrubber 38. If required, the residence time requirement can be compensated for by using a slight excess of ozone. If the volume of the duct (Zones A and B) is insufficient or if the duct cannot be partitioned, then the bottom portion of the scrubber 38 may be partitioned to create Zones A and B for oxidation. If sulfur oxides are also present, the internal arrangements in the scrubber may be made necessary to avoid droplets from the spray section falling into the oxidation zone. If the physical partitioning of the bottom of the scrubber 38 is not an option, then ozone can be introduced in the section of the bottom if the oxidized portion of the gas stream rises to the scrubbing section vertically without mixing with remaining gas stream. In this manner a selective portion of gas stream is treated without physically partitioning gas flow. With the help of modern flow modeling tools, such as computational fluid dynamics (CFD), it is now possible to ensure that a substantial part of ozone mixed portion remains isolated until oxidized $NO_X$ is captured in the scrubbing section. Thus the present invention can also be practiced without physically separating the gas stream for treating with ozone.

As further illustrated in FIG. 4, the scrubber 38 is sprayed with an aqueous medium 36 from a sump 35 via pump 41 through the header spray assembly 37 and spray nozzles 39. Scrubbing medium sprayed in the gas stream removes remaining contaminants such as $SO_2$, HCl, etc. The sump 35 is supplied with an aqueous medium 36 made up of water, reagents, etc. Part of the scrubbing medium may be continuously or intermittently purged by stream 43 to maintain dissolved and suspended solids within the operating range. Nitrogen oxides scrubbing is insignificantly affected by pH in the range of 2 to 14 or the presence of dissolved or suspended solids content and, therefore, other parametric controls, such as pH control and purge control, are not described in detail herein. The scrubbed gas stream in the scrubber column 38 then flows through the mist removal/droplet separation device 42 and exits to the atmosphere treated gas as stream 40 from the outlet of scrubber 38. In a typical limestone based wet flue gas desulfurization (FGD), scrubber sump 35 is fitted with an air sparger, not shown, to oxidize calcium sulfite to sulfate.

Figure 5:
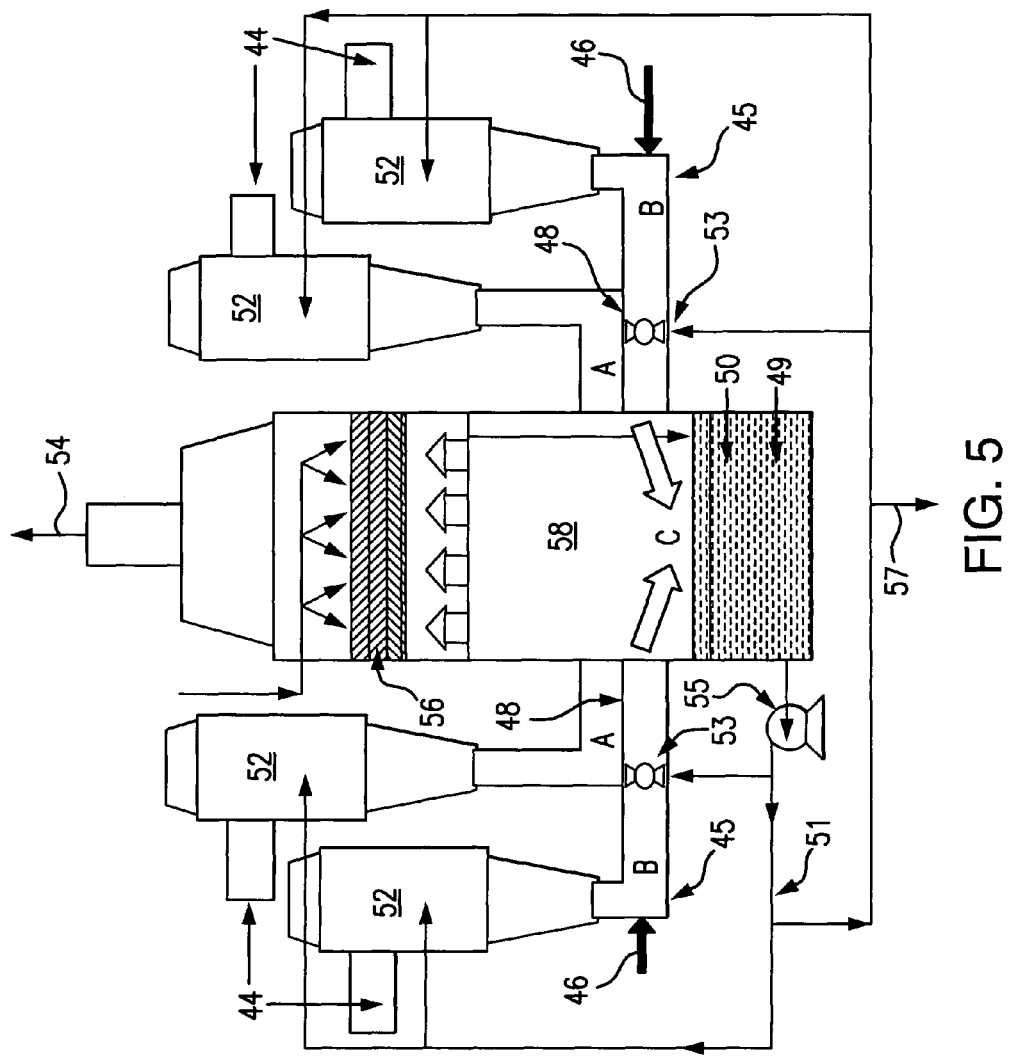
FIG. 5 is a system flow diagram of a process for nitrogen oxides removal in a multi-Venturi wet scrubbing apparatus.

Now referring to FIG. 5, there is schematically illustrated a multi-Venturi wet scrubbing apparatus. Flue gas from a fluid catalytic cracking (FCC) regenerator off gas stream 44 is treated for up to 50% nitrogen oxides removal in the illustrated example. The scrubbing apparatus consists of four Venturis for gas-liquid contacting. The FCC regenerator off gas stream 44 is scrubbed in four Venturi scrubbers, each designated by the numeral 52, prior to admixing with ozone. The FCC regenerator off gas stream is conveyed to the four Venturi scrubbers 52. Each fluid gas stream 44 is brought into contact with a scrubbing medium in the Venturis to remove acid gas including sulfur oxides, HCl, etc. and particulate matter, such as coke and catalyst fines present in the FCC regenerator off gas. Output ducts from pairs of Venturi scrubbers 52 are united to form an elbow duct. Ozone is introduced and mixed by an injection system 46 into each elbow duct. A partition 48 divides each elbow duct into Zones A and B. The injection system 46 delivers ozone into duct 45 forming Zone B of each elbow duct to treat 50% of the flue gas stream conveyed from each pair of the Venturi scrubbers 52.

Ozone from injection system 46 is mixed with the portion of gas stream in the duct 45 forming an oxidation zone, designated Zone B which has a larger volume than Zone A. Contaminants including nitrogen oxides are completely oxidized in Zone B prior to reaching aqueous medium sprays 53 at the end of the elbow duct. Both elbow ducts open into Zone C of a disengagement drum 58. Oxidized contaminants such as $N_2O_5$ and $HNO_3$ are readily captured in aqueous sprays 53. The gas streams exiting from the elbow ducts are allowed to mix in Zone C in the bottom section of the drum 58. If the residence time available in the elbow ducts is insufficient, the bottom portion of the drum 58 may also be partitioned to continue oxidation in the drum to allow nitrogen oxides absorbed in the coalescing droplets discharged from a mist eliminator 56.

The Venturi scrubbers 52 are supplied with an aqueous medium from the sump 49 via pump 55 through a header 51. The same medium is also routed to spray nozzles 53. Scrubbing medium sprayed into the gas stream also removes any remaining contaminants such as $SO_2$. The sump 49 is supplied with an aqueous medium 50 made up of water, reagents, etc. Some medium may be continuously or intermittently purged by stream 57 to maintain dissolved and suspended solids within operating range. Nitrogen oxides scrubbing is insignificantly affected by pH in the range of 2 to 14 or the presence of dissolved or suspended solids content and, therefore, other parametric controls, such as pH control and purge control, are not described in detail herein. The gas stream from the disengagement drum 58 flows through the tray and mist eliminator assembly 56 and exhausted to the atmosphere as treated gas stream 54.

In accordance with the present, nitrogen oxides emissions are lowered from 35 to 45 parts per million to less than 20 parts per million by treating 50% of the gas stream.

Figure 6:
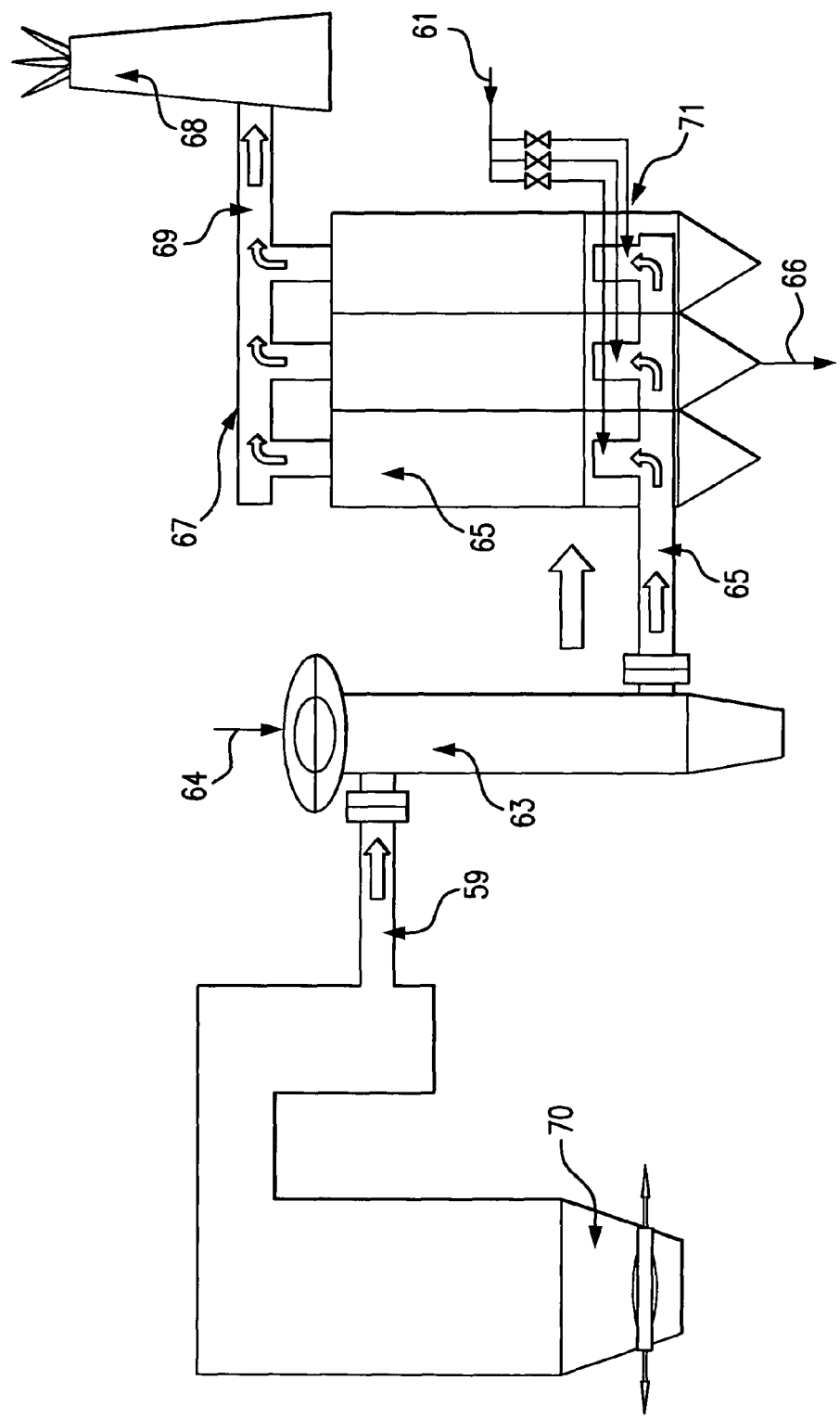
FIG. 6 is a system flow diagram of a process for nitrogen oxides removal in a dry scrubbing capture device.

In the embodiment of the present invention shown in FIG. 6, a flue gas stream 59 emitted from a combustion device 70 is scrubbed in spray dryer scrubber 63 with alkali or alkaline hydroxide, carbonate or bicarbonates or mixtures thereof in a reagent spray 64 for the removal of contaminants except nitrogen oxides. Environmental regulations mandate lowering the nitrogen oxides by 60 to 65% in two steps.

In the spray dryer scrubber 63, the hot gas stream 59 is contacted with the aqueous reagent stream 64 to remove sulfur oxides, HCl, mercury and other contaminants. The aqueous reagent stream due to heat forms finely dusted solids in the gas stream. These solids are carried with the exiting gas stream via duct 60 to a bag house 65 containing bags made of fabric filter. The bag house 65 is generally modular with multiple chambers. FIG. 6 illustrates three chambers for bag house 65. An ozone containing gas stream 61 is conveyed through a manifold 71 for mixing with a flue gas stream entering any one or all of the three chambers of bag house 65 depending on nitrogen oxides content and removal required. Assuming the flow of the flue gas stream is distributed equally, adding a slight excess of ozone in one chamber provides around 33% nitrogen oxides removal while adding ozone in any two out of the three chambers provides 66% nitrogen oxides removal. Oxidized nitrogen oxides are then adsorbed on solid reagent in the bag house 65.

Solids are retained inside the bags while the gas streams flow through the fabric filter medium. Solids retained and collected on the surface of bags eventually fall by pulsating flow and are collected in the bottom section of the bag house. Solids are periodically or continuously discharged as stream 66 for disposal.

All gas streams from the various chambers are reunited in the exhaust duct 67 forming a treated gas stream 69. On mixing the gas streams exiting various chambers in the duct, any residual ozone present is immediately consumed by the remaining nitrogen oxides in the treated gas stream 69 which is then vented to the atmosphere through stack 68.

Initially in the first stage, in order to meet the 30% emissions reduction, ozone is introduced only into one chamber of the bag house 65. At a later time, to meet the 60 to 65% reduction, gas streams in any two out of three chambers may be treated with a slight stoichiometric excess of ozone.

Figure 7:
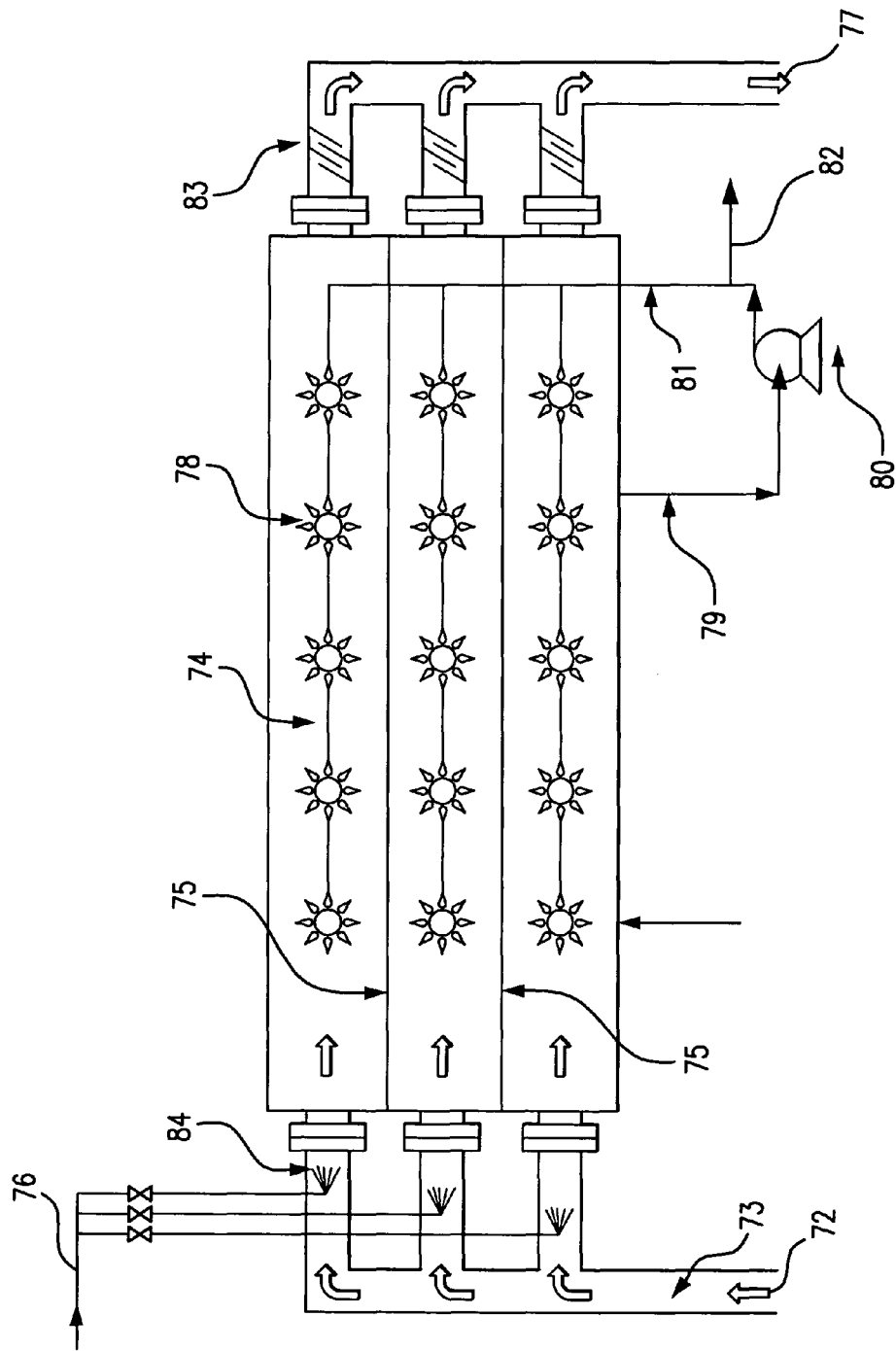
FIG. 7 is a system flow diagram of a process for nitrogen oxides removal in a partitioned horizontal spray scrubber.

Now referring to FIG. 7, there is schematically illustrated a partitioned horizontal spray scrubber. An untreated gas stream 72 is conveyed through duct manifold 73 to a horizontal wet spray scrubber 74. Two partitions 75 extending horizontally in the scrubber 74 divide the scrubber 74 into three equal chambers. The duct manifold 73 divides the gas stream 72 almost equally to three chambers. An ozone containing gas stream 76 is conveyed into manifold 73 via nozzles 84 for mixing with flue gas stream entering any one, two or all three chambers depending on $NO_X$ content and removal required.

For flue gas with 0.4 to 0.45 lb per MMBTU $NO_X$ content in the stream 72 requiring $NO_X$ reduction to 0.15 lb per MMBTU outlet in stream 77, gas entering two of the three chambers of scrubber 74 is admixed with ozone.

Ozone quickly oxidizes contaminants such as $NO_X$, Hg etc in the duct entering the scrubber prior to reaching array of nozzles 78 that deliver an aqueous medium spray. Oxidized contaminants such as $N_2O_5$ and $HNO_3$ are readily captured in aqueous sprays along with SOx, HCl and other contaminants. If the scrubber volume upstream of the spray zone (spray array 78) is inadequate, the residence time requirement for almost complete removal of $NO_X$ can be compensated by using slight excess of ozone.

Scrubber 74 is sprayed with an aqueous medium 79 from a sump via pump 80 through header spray assembly 81 and the array of spray nozzles 78. The sump is supplied by an aqueous stream make up of water, reagents such as lime, limestone, soda ash, caustic, alkali, alkaline earth metal, ammonia hydroxides, carbonates, bicarbonates and mixtures thereof. Part of the scrubbing medium may be continuously or intermittently purged by stream 82 to maintain dissolved and suspended solids within the operating range. $NO_X$ scrubbing is very slightly affected by pH in the range of 2 to 14 or presence of dissolved or suspended solids content and, therefore, other parametric controls such as pH control and purge controls are not described in detail herein. In a typical limestone based wet FGD (Flue Gas Desulfurization), scrubber sump may also be fitted with air to oxidize of calcium sulfite to sulfate which is not shown in FIG. 7.

The fine droplets and mist from flue gas leaving each of three chambers are removed in a mist removal device 83, and gas streams are reunited in the duct forming treated gas stream 77. Any residual ozone present in the various chambers is immediately consumed by remaining $NO_X$ in the treated gas stream 77.

With the present invention, consumption of ozone is 25% less in lowering $NO_X$ content from 0.45 lb/MMBTU to 0.15 lb/MMBTU compared to what is reported in the prior art (U.S. Pat. Nos. 6,162,409; 5,206,002; 6,649,132; and 7,303,735) under identical conditions.

In an another example, $NO_X$ emissions from a bio mass fired boiler is required to be lowered in a first stage from 0.7 lbs/MMBTU to 0.45 lbs and finally in the second stage to less than 0.3 lbs/MMBTU. Environmental regulations do not require scrubbing of any other pollutants. The proposed solution provides flexibility in stage wise reduction of $NO_X$ by treating required amount of gas stream with slight stoichiometric excess of ozone at each stage.

Figure 8:
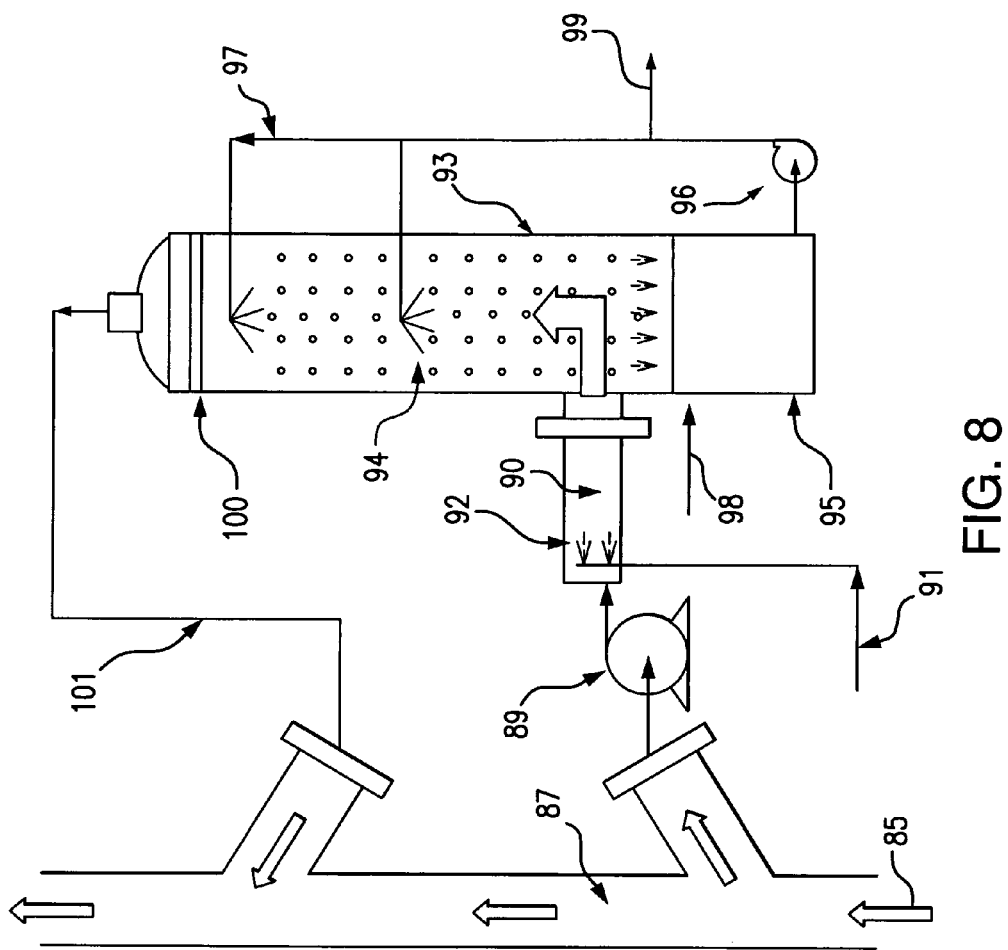
FIG. 8 is a system flow diagram of a process for nitrogen oxides removal by scrubbing a portion of a gas stream.

Referring to the embodiment shown in FIG. 8, there is shown schematically a device for partial scrubbing of a flue gas stream. An untreated gas stream 85 is conveyed through main gas header 87. A portion of the gas stream in header 87 is diverted by a fan 89 into a duct 90 is almost directly proportional to $NO_X$ removal requirements. For 50% $NO_X$ removal, 50% gas stream 85 is directed by fan 89 into the duct 90. The flow of the gas is varied by a variable frequency drive control of the fan 89. Ozone supplied from a source 91 is conveyed to ozone injector nozzles 92 where ozone is mixed with the gas stream in duct 90. The amount of ozone injected is in slight excess of stoichiometric requirement-based on amount of $NO_X$ present in this portion of the gas stream. Stoichiometric requirement is 1.5 moles of ozone per mole of NO content and 0.5 moles of ozone per mole of $NO_2$ content in this portion of the flue gas stream.

The gas stream mixed with ozone is conveyed from duct 90 into a column scrubber 93. The ozone in duct 90 quickly oxidizes contaminants such as $NO_X$, Hg etc. in the flue gas stream entering the scrubber 93 prior to reaching an aqueous spray from nozzles 94 vertically spaced apart in scrubber 93. Oxidized contaminants such as $N_2O_5$ and $HNO_3$ are readily captured in the aqueous sprays from nozzles 94 along with any other contaminants, if present.

Scrubber 93 is supplied with an aqueous medium from scrubber sump 95 via recirculation 96 through a spray header assembly 97 to the array of spray nozzles 94 in scrubber 93. Sump 95 is supplied with an aqueous medium 98 made up with water, reagents such as lime limestone, soda ash, caustic, alkali, alkaline earth metal, ammonia hydroxides, carbonates, bicarbonates and mixtures thereof. Part of the scrubbing medium 98 may be continuously or intermittently purged by a stream 99 to maintain dissolved and suspended solids within the operating range. $NO_X$ scrubbing is very slightly affected by pH in the range of 2 to 14 or presence of dissolved or suspended solids content and therefore, other parametric controls such as pH control and purge controls are not described in detail herein.

Fine droplets and mist from the treated flue gas exiting the scrubber 93 after the aqueous sprays are removed by a mist removal device 100. Thereafter, the treated gas stream 101 is reunited with the untreated part of the flue gas stream 85 in the gas header 87. On mixing treated gas stream 101 with untreated gas stream 85 any residual ozone present is immediately consumed by $NO_X$ in the untreated portion of gas stream 85.

While this invention has been described with respect to particular embodiments thereof, it is apparent that numerous other forms and modifications of the invention will be obvious to those skilled in the art. The appended claims in this invention generally should be construed to cover all such obvious forms and modifications which are within the true spirit and scope of the present invention.

I claim:

1. A method for the partial removal of contaminants from a process gas stream comprising the steps of:
   separating a process gas stream into at least two process gas streams,
   feeding ozone into contact with at least one of the separated process gas streams to oxidize the contaminants in the gas stream, and
   feeding at least one of the process gas streams contacted by ozone to a scrubber for removal of the oxidized contaminants from the gas streams.

2. A method as set forth in claim 1 which includes,
   partitioning the scrubber into at least two chambers for receiving the process gas streams,
   conveying the process gas stream into the partitioned scrubber to divide the gas stream proportionally based on desired $NO_X$ removal into at least two process gas streams fed through the two chambers, and
   selectively feeding ozone into at least one of the chambers for admixing with the process gas stream fed through the chamber to quickly oxidize the contaminants in the gas stream.

3. A method as set forth in claim 1 which includes,
   capturing the oxidized contaminants in the separated gas stream in a capture device for removal of the oxidized contaminants from the separated gas stream.

4. A method as set forth in claim 1 which includes,
   conditioning the process gas stream containing contaminants prior to admixing with ozone by selectively cooling, quenching, and pre-scrubbing of the contaminants.

5. A method as set forth in claim 1 which includes,
   treating a first preselected percentage of the process gas stream with ozone for oxidation of the contaminants therein,
   thereafter treating a second preselected percentage of the process gas stream with ozone greater than the first preselected percentage of the treated gas stream, and
   further treating a third preselected percentage of the process gas stream with ozone greater than the second preselected percentage of the treated gas stream to where substantially all of the contaminants are removed from the process gas stream.

6. A method as set forth in claim 1 which includes,
partitioning the scrubber into at least two chambers to receive in one chamber the oxidized portion of the process gas stream,
contacting the oxidized portion of the process gas stream with a scrubbing medium in the scrubber to remove the oxidized contaminants from the process gas stream,
capturing the oxidized contaminants removed from the process gas stream, and
thereafter unifying the portion of the process gas stream free of contaminants with the portion of the process gas stream containing contaminants.

7. A method as set forth in claim 1 which includes,
unifying the gas stream free of contaminants and containing excess ozone with the gas stream containing contaminants, and
oxidizing the excess ozone in the unified gas stream upon contact with the gas stream containing contaminants to thereby remove excess ozone from the unified gas stream.

8. A method as set forth in claim 1 which includes,
mixing a preselected percentage of the process gas stream containing contaminants with a preselected percentage of the process gas stream free of contaminants and containing excess ozone to form a unified gas stream, and
consuming the excess ozone by the contaminants present in the unified gas stream.

9. A method as set forth in claim 1 which includes,
reducing the residence time of the separated process gas streams in the scrubber by adding an excess of ozone to the separated gas stream.

10. A method for the partial removal of contaminants from a process gas stream comprising the steps of:
conditioning the process gas stream emitted from a combustion process,
separating the process gas stream into at least two process gas streams,
injecting ozone into at least one of the separated process gas streams to provide mixing of the ozone with the contaminants including nitrogen oxides in the separated process gas stream,
oxidizing nitrogen oxides in the separated process gas stream by mixing with ozone,
capturing the oxidized nitrogen oxides in a capture device to remove the nitrogen oxides from the separated process gas stream, and
recombining the separated process gas stream substantially free of nitrogen oxides with the remainder of process gas stream containing contaminants.

11. A method as set forth in claim 10 which includes,
removing the oxidized nitrogen oxides in the separated gas stream on condensing surfaces selected from the group consisting of a heat exchanger, a condenser, and a coalescing device.

12. A method as set forth in claim 10 which includes,
capturing the oxidized contaminants removed from the gas stream in a capture device selected from the group consisting of a fabric filter, wet and dry electrostatic precipitators, a wet scrubber, a dry scrubber, a bag house, condensing surfaces, and a mist separator.

13. A method as set forth in claim 10 which includes,
removing a preselected percentage of the process gas from the process gas stream for oxidation of substantially the same percentage of nitrogen oxides in the process gas as the percentage of process gas removed from the gas stream.

14. A method as set forth in claim 10 which includes,
recombining the gas stream free of nitrogen oxides with the gas stream containing nitrogen oxides, and
consuming any excess ozone present in the recombined gas streams by mixing the ozone with contaminants present in the recombined gas stream.

15. A method as set forth in claim 10 which includes,
treating one of the separated process gas streams with ozone to rapidly oxidize the contaminants therein prior to feeding the treated process gas stream to the capture device,
spraying the treated gas stream with an aqueous medium in the capture device to intrain the oxidized contaminants in the aqueous spray,
removing mist and droplets from the treated process gas stream exiting the capture device, and
reuniting the treated process gas stream with the process gas stream containing contaminants to consume any excess ozone present in the reunited process gas streams by the contaminants contained therein.

16. A method as set forth in claim 10 which includes,
recombining the separated gas stream substantially free of oxidized nitrogen oxides removed therefrom with the remaining separated gas stream not treated by ozone to form a unified gas stream, and
consuming in the unified gas stream excess ozone present in the gas stream free of oxidized nitrogen oxides by mixing the excess ozone with the nitrogen oxides in the untreated gas stream to remove all excess ozone from the unified gas stream.

17. Apparatus for the partial removal of contaminants from a process gas stream comprising,
a duct for conveying a process gas stream from the exhaust of a combustion process,
a scrubber connected to said duct for receiving the process gas stream containing contaminants,
a source of ozone introduced into a first zone of the process gas stream in said scrubber for selective mixing with the process gas stream and a second zone of the process gas stream in said scrubber being free of ozone, and
the ozone mixed with the process gas stream in said first zone oxidizes the nitrogen oxides present in the process gas stream first zone.

18. Apparatus for the partial removal of contaminants from a process gas stream as set forth in claim 17 which includes,
said duct partitioned into a first chamber and a second chamber for receiving the process gas stream,
said duct first chamber being injected with ozone,
said duct first chamber receiving ozone for mixing with the process gas stream in to oxidize the contaminants therein,
a third chamber of said duct positioned downstream of the duct first and second chambers having an aqueous spray medium for capturing the oxidized contaminants in the process gas stream to remove the contaminants oxidized in the first zone of the process gas stream,
said duct third chamber conveying the process gas stream from the first zone free of contaminants and the process gas stream from the second zone containing contaminants to said scrubber,
said scrubber remixing the process gas streams from the first and second zones, and
said scrubber generating a spray of aqueous medium into the remixed process gas streams to remove any remaining contaminants oxidized by excess ozone remaining in the remixed process gas streams.

19. Apparatus for the partial removal of contaminants from a process gas stream as set forth in claim 17 which includes,
    said scrubber including a plurality of Venturi scrubbers for receiving a stream of process gas from the combustion process,
    said Venturi scrubbers each provided with a scrubbing medium to contact the process gas stream flowing therethrough to remove acid gases and particulate matter from the process gas,
    a duct partitioned into a first chamber and a second chamber for receiving the process gas discharged from said Venturi scrubbers,
    said duct first chamber selectively injected with ozone for mixing with the process gas in said duct first chamber so that only a preselected percentage of the process gas flowing from said Venturi scrubbers is oxidized,
    a capture device for receiving the process gas streams from said duct first and second chambers, and
    said capture device provided with aqueous medium sprays for capturing the oxidized contaminants in the process gas to remove the oxidized contaminants from the process gas stream.

20. Apparatus for the partial removal of contaminants from a process gas stream as set forth in claim 17 which includes,
    an aqueous reagent stream contacting the process gas stream in said duct to form finely dusted solids in the process gas stream,
    a modular capture device including a bag house having a plurality of chambers for receiving the gas stream containing the finely dusted solids,
    an injector for supplying ozone into preselected chambers of said bag house having a solid reagent to obtain a preselected percentage of oxidation of contaminants in the gas stream,
    said solid reagent in said chambers of said bag house absorbing oxidized contaminants while the gas stream free of contaminants exits said chamber,
    an exit duct extending from each of said chambers to unite the gas streams flowing from each of said chambers forming a treated gas stream, and
    said exit duct providing for mixing of the gas streams exiting said chambers so that any residual ozone is consumed by the contaminants remaining in the treated gas stream.

21. A method for the partial removal of contaminants from a process gas stream comprising the steps of:
    conditioning the process gas stream emitted from a combustion process,
    injecting ozone into a portion of process gas stream to provide mixing of the ozone with the contaminants including nitrogen oxides in the selected portion of the process gas stream,
    oxidizing nitrogen oxides in the selected portion of the process gas stream by mixing with ozone,
    capturing the oxidized nitrogen oxides in a capture device to remove the nitrogen oxides from the selected portion of the process gas stream, and
    recombining the selected portion of the process gas stream with the remainder of process gas stream containing contaminants.

\* \* \* \* \*